UNITED STATES PATENT OFFICE 2,232,527

SEPARATION OF COBALT

Cyril Thomas Hill, Marlow, England, assignor to The Pyrites Company Limited, London, England No Drawing. Application October 5, 1940, Serial No. 359,912

7 Claims. (Cl. 75—108)

The invention consists in a direct method for separating cobalt from zinc and small quantities of nickel in solution. Hitherto it has not been possible to effect this separation in one operation and whatever method has been adopted, it has generally been necessary to effect several repetitions of the separating step in order to obtain reasonably pure cobalt compounds.

According to this invention, cobalt is precipitated from a solution containing cobalt, zinc and nickel by adding a soluble alkaline precipitant, preferably sodium carbonate, either in the solid state or in solution, to the warm solution until the whole is neutral to litmus, and thereafter passing in chlorine until the hydrogen ion concentration corresponds to pH 2.5. The precipitate is then separated and washed. In this way practically the whole of the cobalt in solution is precipitated, whilst almost the whole of the zinc and most of the nickel is left in the filtrate.

The addition of the soluble alkaline precipitant causes precipitation of all three elements, but the subsequent addition of chlorine has the effect of re-dissolving the zinc and nickel so that a relatively pure precipitate of cobalt is obtained in the one operation.

If manganese is also present, as is very frequently the case with solutions containing cobalt in industrial practice, it is desirable to remove it by preliminary precipitation. This preliminary precipitation may be effected by saturating the solution with chlorine and adjusting the acidity so that after saturation, the hydrogen ion concentration corresponds to about pH 1.5. Preferably the adjustment of the acidity is effected before saturation with chlorine and according to concentration of the manganese salts present. Thus for a solution containing 0.1 gram per litre of manganese, the acidity is adjusted to about pH 4.0 before saturation, whilst with 0.2 gm. manganese per litre, the acidity is adjusted to about pH 5.0 before saturation. In both cases, after saturation the pH will be about 1.5. Generally, the higher is the manganese content, the higher should be the pH of the solution before saturation. If the acidity is correctly adjusted, practically the whole of the manganese is precipitated with small quantities only of cobalt.

Where iron, copper and lead are present in addition, it is desirable to remove them by a separate stage of precipitation before manganese is separated. This preliminary separation can be effectively carried out by first oxidising the solution until the iron and copper salts present are completely in the ferric and cupric states. Complete oxidation is necessary, but excess of strong oxidising reagents is to be avoided, since when such excess is present subsequent precipitation will cause some cobalt to be carried down. The oxidised solution is treated with an alkaline precipitant until no further precipitation occurs. In the phrase "alkaline precipitant" is included the oxides, hydroxides or carbonates of the alkali metals, the alkaline earth metals, ammonia and magnesia. These materials are equivalent for the purpose of the precipitation. Calcium carbonate in the form of pulverised limestone gives very satisfactory precipitation, in that the precipitate obtained filters very readily and contains only traces of cobalt, and since limestone is a cheap material, it is preferred to use this as the alkaline precipitant.

As soluble alkaline precipitant to be used for the precipitation of the cobalt, there can be employed any of the soluble oxides or hydroxides or carbonates of the alkali or alkaline earth metals or ammonia, preferably in solution. These materials are equivalent for the precipitation of cobalt, but it has been found that sodium carbonate gives particularly favourable results, in that the precipitate is easily filtered and washed, and contains minimum proportions of zinc and nickel.

The invention may advantageously be applied to the recovery of cobalt from iron pyrites in which it is found to occur. Such iron pyrites may contain up to 2% of cobalt, together with copper, zinc, nickel, lead and other non-ferrous metals in smaller proportions. In one iron pyrites from which cobalt has been recovered in accordance with the present invention, there is found 1.4% cobalt, 1.0% copper, 0.3% zinc and small quantities of nickel, manganese and lead.

The pyrites is roasted in the ordinary way for the preparation of $SO_2$ gases, and the cinders are chloridised for recovery of the non-ferrous metal values. The chloridising is carried out by the usual method, in which the amount of salt and additional pyrites added to the cinders before roasting is about two to three times the combined percentage of non-ferrous metals in the original pyrites. After the chloridising roast, the cinders are leached to give a solution of optimum concentration, using liquor containing about 0.5% of free acid as $H_2SO_4$.

The solution obtained, which carries about 10 gms. cobalt, 7 to 8 gms. copper and 2 to 3 gms. zinc per litre, with smaller quantities of nickel, manganese and lead, is oxidised by passing in chlorine until the copper is all in the cupric state. At this stage, the iron has all been oxidised to the ferric condition, but if a large excess of chlorine is avoided, the manganese is not completely oxidised and the cobalt is only slightly oxidised. The liquor will be moderately warm at this point since cinders will normally be treated soon after leaving the chloridising furnaces.

The oxidised solution is now treated with pulverised limestone which is stirred in slowly until no further precipitation occurs. Lead, iron and copper are precipitated completely whilst cobalt, manganese, nickel and zinc remain substantially completely dissolved.

The precipitate is filtered off and washed, and the filtrate and washings treated with acid in order to adjust the hydrogen ion concentration for manganese precipitation. The manganese content is determined by analysis and the acidity adjusted accordingly. If more than 0.2 gm. per litre of manganese is present, no acid need be added. If the manganese content is below 0.2 the pH should be brought to 5 or under and if the manganese content is not more than 0.1 gm., the pH should not exceed 4.0. The adjustment of acidity is a necessary step, but it is not vital that it should be an exact operation, since the addition of chlorine will of itself increase the acidity very considerably and the final pH can be adjusted to the desired value of 1.5 by adding further acid after the chlorine, if necessary.

The manganese is oxidised and practically the whole is precipitated as an insoluble compound somewhat similar to the well known Weldon mud of the alkali industry. Very little cobalt comes down with the manganese and under normal conditions it will not be worth while to treat the precipitate for further recovery of cobalt.

The solution now containing practically the whole of the original cobalt, together with zinc and nickel, is heated to about 170° F., and sodium carbonate solution is added with agitation until the whole is neutral. A basic carbonate precipitate containing most of the cobalt, zinc and nickel present is thrown down. The mixture is treated with chlorine until the pH is reduced to 2.5. The basic carbonates are decomposed and the cobalt completely oxidised and precipitated whilst most of the nickel and zinc previously precipitated are taken up again into solution. The precipitate is filtered and washed, and is found to be practically free from zinc and nickel. Usually the precipitate contains a certain amount of sulphur as basic sulphate, and in order to remove this, it is pulped into a small excess of sodium carbonate solution and again filtered and washed.

I claim:

1. Method of separating cobalt from solutions containing cobalt, zinc and nickel consisting in adding a soluble alkaline precipitant to the warm solution until the pH rises to 7.0, and thereafter passing in chlorine until the pH falls to 2.5.

2. Method of separating cobalt from solutions containing cobalt, zinc and nickel consisting in adding sodium carbonate to the warm solution until the pH rises to 7.0, and thereafter passing in chlorine until the pH falls to 2.5.

3. Method of separating cobalt from solutions containing cobalt, zinc and nickel and which may also contain manganese consisting in saturating the solution with chlorine and adjusting the acidity to about pH 1.5, removing the precipitate, heating the solution and adding sodium carbonate until the pH rises to 7.0, and thereafter passing in chlorine until the pH falls to 2.5.

4. Method of separating cobalt from solutions containing cobalt, zinc and nickel and which may also contain iron and copper salts consisting in oxidising any iron and copper salts present to the ferric and cupric states respectively in acid solution, adding an alkaline precipitant until no further precipitation occurs, removing the precipitate, saturating the solution with chlorine and adjusting the acidity to about pH 1.5, again removing the precipitate, heating the solution and adding sodium carbonate until the pH rises to 7.0 and thereafter passing in chlorine until the pH falls to 2.5.

5. Method of separating cobalt from solutions containing cobalt, zinc and nickel and which may also contain iron and copper salts consisting in oxidising any iron and copper salts present to the ferric and cupric states respectively in acid solution, adding pulverised limestone until no further precipitation occurs, removing the precipitate, saturating the solution with chlorine and adjusting the acidity to about pH 1.5, again removing the precipitate, heating the solution and adding sodium carbonate until the pH rises to 7.0, and thereafter passing in chlorine until the pH falls to 2.5.

6. A method of separating cobalt from solution in which the solution is obtained by roasting a cobalt-bearing iron pyrites, chloridising the cinders, and acid-leaching the chloridised cinders, which consists in oxidising the leach solution until iron and copper salts present are in the ferric and cupric states respectively, adding an alkaline precipitant until no further precipitation occurs, removing the precipitate, saturating the solution with chlorine and adjusting the acidity to about pH 1.5, again removing the precipitate, heating the solution and adding a soluble alkaline precipitant until the pH rises to 7.0, and thereafter passing in chlorine until the pH falls to 2.5.

7. A method of separating cobalt from solution in which the solution is obtained by roasting a cobalt-bearing iron pyrites, chloridising the cinders, and acid-leaching the chloridised cinders, which consists in oxidising the leach solution until iron and copper salts present are in the ferric and cupric states respectively, adding pulverised limestone until no further precipitation occurs, removing the precipitate, saturating the solution with chlorine and adjusting the acidity to about pH 1.5, again removing the precipitate, heating the solution and adding sodium carbonate until the pH rises to 7.0, and thereafter passing in chlorine until the pH falls to 2.5.

CYRIL THOMAS HILL.